United States Patent [19]

Eder

[11] Patent Number: 4,572,472
[45] Date of Patent: Feb. 25, 1986

[54] ELECTRIC MOTOR FLEXIBLE MOUNTING SYSTEM AND METHOD OF ASSEMBLY

[75] Inventor: Jeffrey S. Eder, Somerville, Mass.

[73] Assignee: Westinghouse Electric Corp., Pittsburgh, Pa.

[21] Appl. No.: 384,351

[22] Filed: Jun. 2, 1982

[51] Int. Cl.[4] ............................................. F16F 15/04
[52] U.S. Cl. .................................... 248/605; 248/603; 248/666
[58] Field of Search ...................... 248/580, 603–605, 248/666; 211/110

[56] References Cited

U.S. PATENT DOCUMENTS

| | | |
|---|---|---|
| 568,905 | 10/1896 | Holmes ............................... 211/110 |
| 1,786,203 | 12/1930 | Gilbert . |
| 1,801,158 | 4/1931 | Howe ................................... 211/110 |
| 1,860,883 | 5/1932 | Bilde . |
| 1,873,343 | 8/1932 | Seyfried . |
| 2,096,621 | 10/1937 | Skolfield . |
| 2,881,995 | 4/1959 | Neher . |
| 2,936,140 | 5/1960 | Copeland . |
| 3,773,285 | 11/1973 | Morrill . |
| 4,063,060 | 12/1977 | Litch . |
| 4,076,197 | 2/1978 | Dochterman . |
| 4,155,529 | 5/1979 | Maudlin . |
| 4,161,667 | 7/1979 | Buckman et al. . |
| 4,253,634 | 3/1981 | Daniels . |
| 4,293,114 | 10/1981 | Lykes . |
| 4,323,217 | 4/1982 | Dochterman ....................... 248/604 |

Primary Examiner—Reinaldo P. Machado
Assistant Examiner—Alvin Chin-Shue
Attorney, Agent, or Firm—G. H. Telfer

[57] ABSTRACT

The mounting system comprises a band for encircling a motor frame, the band having outwardly extending apertured projections at which are located the inner scrolled end of a flexible mounting arm. A riveted hinge pin extends through the band projections and the inner end of the arm. In assembly, the arms and band are assembled prior to placement of the mounting elements on the motor to permit separate handling and shipment during which the hinge mounted arms may be folded over for compactness.

7 Claims, 5 Drawing Figures

ELECTRIC MOTOR FLEXIBLE MOUNTING SYSTEM AND METHOD OF ASSEMBLY

BACKGROUND AND SUMMARY OF THE INVENTION

This invention relates to electric motors and mounting apparatus therefor, particularly for direct drive blower motors, with minimized noise and vibration.

It has been common to mount motors within a blower housing by having mounting arms attached to the motor frame itself and the blower housing with a fan directly mounted on the motor shaft. Such systems may permit vibrations from the motor to be transmitted to the blower housing to a degree that results in objectionable noise. It has been recognized that the physical characteristics of the mounting arms can substantially affect the transmission of vibrations and generally that the more rigid the mounting system is the more vibrations are transmitted. In order to maintain the motor in a relatively fixed location for its intended driving function, while reducing transmitted vibrations, there have been many techniques developed over the years which provide flat sheet metal mounting arms located with their flat surfaces in a longitudinal direction. Such mounting arms provide axial and radial rigidity while having a high degree of torsional flexibility which has been found favorable for reduced vibration transmission.

The present invention relates to a mounting system of the general type described above in a particular form for achieving multiple advantages of convenience, economy, and capability. In accordance with this invention, the motor has a band encircling the motor body and fastened on itself for secure retention. The band is a unitary sheet metal element that lies flat against the motor and at a plurality of spaced locations has a pair of projections outwardly extending from the major portion of the band with apertures aligned parallel to the shaft axis. The apertures in the projections of the band accommodate a hinge pin running through the inner circular end of a mounting arm that has a torsionally flexible characteristic. The mounting arm has its other extremity adapted for fastening to a blower housing.

The preferred method of assembly of the mounting system is to form or obtain the band with the apertured projections as described above, orient the inner scrolled end of the mounting arm between the apertured projections of the band, insert the hinge pin through the band projections and the scrolled end of the mounting arm, fasten the hinge pin in place, preferably by riveting, and after all the arms have been so attached to the band to assemble the band on the motor body.

The favorable characteristics of the mounting system include its ability for use on a variety of motor frame types, including some of relatively open construction which have minimal or no area available for the attachment of mounting elements by welding. The present mounting system requires no welding whatsoever which is further favorable in that it avoids the need for any special care to prevent welding heat from damaging the characteristics of the torsionally flexible arms or other parts of the system.

The manufacture and supply of mounting arms, the band, or the band/mounting arm subassembly, may be separate from the motor itself. The pivotal mounting of the arms on the band permits them to be folded over after assembly during shipment or storage until they are needed on a motor. The band permits adjustment in its location along the motor body to any desired point and also facilitates replacement as needed after initial assembly.

The cost and convenience of use of the present mounting sysem is favorable as compared to other known flexible mounting systems while attaining dampening characteristics at least as good as other systems.

DESCRIPTION OF THE PREFERRED EMBODIMENTS

Figure 1:
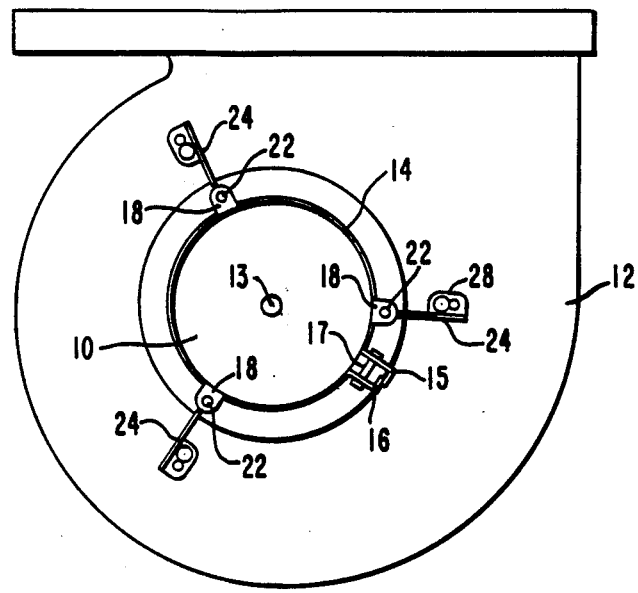
FIG. 1 is an elevation view of a motor and mounting system in accordance with an embodiment of the present invention.
Figure 3:
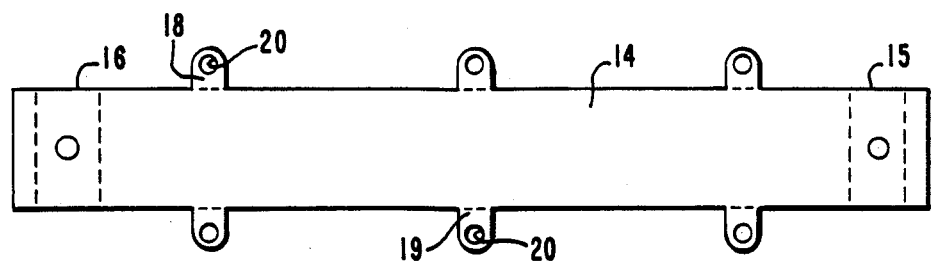
FIG. 3 is a plan view of a band used in forming a mounting system in accordance with the invention; and, FIGS. 4 and 5 are respectively side and end views of a mounting arm for use in the practice of the present invention.

FIG. 1 shows a motor 10 installed in a blower housing 12 by use of a mounting system in accordance with an embodiment of the present invention. The motor 10 has a generally cylindrical configuration as defined by its exterior surface. The frame or exterior of motor 10 may be apertured and need not be continuous throughout the entire circumference. A band 14 encircles the motor 10 and is a unitary sheet metal element, such as shown in FIG. 3, that is secured on itself at projections 15-16 through which a fastener 17 is attached. The major portion of the band 14 lies against the motor and at each of a plurality of spaced locations a pair of projections 18-19 extend outwardly from the major portion and have apertures 20 aligned parallel with the axis of the motor shaft 13 on which the driven fan element is mounted. The band 14 is shown in its original, flat form in FIG. 3. A hinge pin 22, such as a rivet, is located between each pair of the aligned projections 18-19 of the band 14 and holds in a pivotal mounting the rolled cylindrical end of a mounting arm 24.

The mounting arm 24 is a unitary sheet metal element having torsional flexibility by reason of thinness in the transverse direction with substantial rigidity in both longitudinal and radial directions in relation to the motor shaft when the mounting arm is attached for operation of the motor as shown in FIG. 1.

Figure 4:
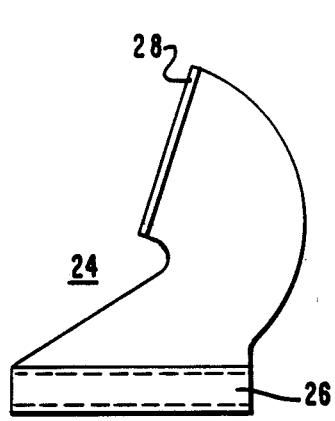
Figure 5:
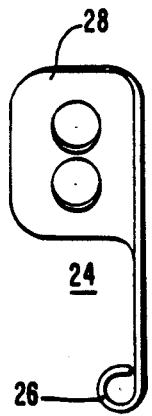

Referring to FIGS. 4 and 5, a first extremity 26 of the mounting arm 24 comprises a substantially cylindrically turned portion element for encircling hinge pin 22 and holding it in pivotal relation. The mounting arm 24 also has a second extremity 28 comprising means for attaching the arm to a housing in which the motor is to be mounted such as a flange element with fastener apertures.

A solid rivet is a satisfactory hinge pin 22. Screws with lock nuts or two piece rivets are also generally suitable.

Figure 2:
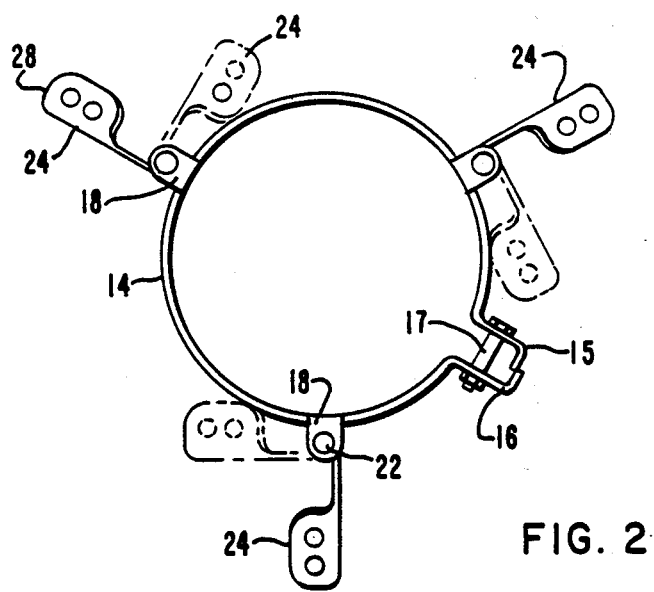
FIG. 2 is a further view of a mounting system in accordance with an embodiment of the present invention.

Applications of particular interest are those in which the motor is a relatively small fractional horsepower single phase AC motor. A typical example is a one-third horsepower motor although other ratings are also appropriate for use with mounting systems in accordance with invention. The invention can be readily applied to different size motors such as 4⅞ inch diameter, 5½ inch diameter, etc., by the use of different size bands. The bands 14 are, for example, stamped from 18 gauge cold rolled sheet steel (ASTM A336) that has been stretched or leveled to insure flatness. The bands may be approximately 1½ inches wide and have three pairs of tabs with holes in them protruding from the width of the band. Each end 15 and 16 of a band is bent up and over in an L-shape and in each L there is a hole used for the tighting screw. In the view of FIG. 3, the dashed lines indicate where the original flat sheet is bent to form elements 15, 16, 18 and 19 as shown in FIGS. 1 and 2.

Small protrusions or dimples could be easily stamped into the band 24 if desired in order to provide greater friction or gripping between the mounting system and the motor and they could provide an electrical ground contact between the motor and the housing. The band is rolled into a circle, the diameter of which depends on the type of motor being used, the tabs are bent upward and the L-shaped bends are made in the end before any additional hardware is added.

The arms are suitably fabricated from cold rolled sheet steel which may be, for example, about 0.035 inch thick. The arms are stamped with holes for the mounting screws in place at end 28. The face of the arm containing the mounting screw holes is bent 90 degrees from the remainder of the flat spring arm. The lower portion of the flat spring arm is then rolled 270 degrees to form a kind of tube at the bottom of the arm. The diameter of the tube produces a frictional fit with the fastener used as a hinge pin. In one instance the diameter is 0.19 inch. The arm extremity 28 is swept back at an angle that provides flexibility for axially positioning the mounting system. After arms are formed in the described geometry, they are heat treated for durability.

Cold rolled sheet steel has been found preferable for use as the mounting arms 24 as compared to martensitic steel for greater reliability in performing the bends necessary to achieve the desired configuration.

The rivets for use as the hinge pins to hold the arms are by way of example plain solid rivets made of carbon steel, 1.75 inches long and 3/16 inches in diameter. They are placed through a tab into the tubular section at the base of the arm and through the other tab before the rivet is upset. A compression force of approximately 250 pounds has been found effective.

An example of a screw suitable for mounting the band onto the motor is a 3/16 diameter, 20 thread per inch, 1 inch long filet head steel screw with a nut specified for use such as an ESNA plus nut, a hex nut locked by nylon inserts. Other similar combinations of screws and lock nuts would suffice for this application.

The fasteners for mounting the outer extremities of the arm to the blower housing may be variously chosen but it is important that these be sufficiently strong and secure in relation to the housing wall in order to avoid any rupture upon shocks encountered in shipping.

The system in accordance with the present invention was subjected to a series of tests to confirm capability under shipping shock, shipping vibration, and rail car humping. There were also tests to determine the capability of withstanding fatigue stresses caused by repeated on-off cycling of the motor. All such tests were favorably passed. Furthermore, the system was subjected to a vibration damping test which confirmed the capability of dampening torsional vibrations in both startup and steady-state conditions with a degree of extra capability as compared with similar mounting systems in which the arms are rigidly attached as by welding to pads on the motor frame.

The steps of the method of assembly of the mounting system in accordance with this invention include: forming the band 14 in its circular configuration with its upstanding projections 18, locating the mounting arms 24 with their scrolled ends 26 between the projections 18, and inserting and fastening the hinge pins 22. This forms a band-arm subassembly that may be handled and shipped separate from the motor, while the band ends 15-16 are only loosely fastened by fastener 17. The arms 24 of the subassembly may be folded over on the hinge pin as shown in the dashed line portion of FIG. 2. Assembly with the motor may thereafter occur as desired, such as just prior to mounting in a blower housing, with the ability to adjust the location of the band along the motor body.

The pivotal mounting aspect of this invention provides the dual purposes of ecomony of assembly and foldability in storage and shipment as well as an apparent effective torsional damping capability when the motor is mounted in use. Furthermore, all elements of the system are assembled without welding so that it is economical to assemble and there is no risk of harm to the characteristic of the mounting arms. It is therefore seen that the multiple objects of a high degree of capability, convenience and low cost are achieved.

I claim:

1. An electric motor mounting system comprising, in combination:
    a motor having a generally cylindrical exterior and a longitudinal shaft;
    a band encircling said motor exterior;
    said band comprising a unitary sheet metal element having a major portion lying against said motor exterior and, at each of a plurality of spaced locations, a pair of axially spaced projections outwardly extending from said major portion with apertures therein aligned parallel with the shaft axis;
    a hinge pin extending through said apertures of said pair of projections at each of said locations;
    a mounting arm, for said hinge pin at each of said locations, having a torsionally flexible characteristic and substantial rigidity both longitudinally and radially in relation to said shaft when said mounting arm is attached for operation of said motor, said mounting arm comprising a unitary sheet metal element located with flat surfaces in a longitudinal direction parallel with the shaft axis;
    said mounting arm having a first extremity comprising a substantially cylindrical element through which said hinge pin extends;
    said mounting arm having a second extremity comprising means for attaching said arm to a housing in which said motor is to be mounted.

2. An electric motor mounting system in accordance with claim 1 wherein:
    said band has outwardly projecting end portions and a fastener extends through and secures said end portions.

3. An electric motor mounting system in accordance with claim 1 wherein:
    said hinge pin, at each of said locations comprises a solid rivet extending through said substantially cylindrical element of said arm and said apertures of said projections of said band.

4. An electric motor mounting system in accordance with claim 1 wherein:
said band has outwardly projecting end portions and a fastener extends through and secures said end portions; and,
said hinge pin, at each of said locations, comprises a solid rivet extending through said substantially cylindrical element of said arm and said aperturs of said projections of said band.

5. An electric motor mounting system comprising:
a band for encircling the exterior of a motor, said band comprising a unitary sheet metal element formed substantially into a cylinder and having, at each of a plurality of spaced locations, a pair of axially spaced projections extending outwardly from a major portion of said band, each of said pairs of projections having apertures therethrough;
a hinge pin extending through said apertures of each of said pair of projections;
a plurality of mounting arms having a torsionally flexible characteristic and substantial rigidity both longitudinally and radially when said arms are in a fully extended radial position, each of said arms having a scrolled end around each of said hinge pins in pivotal relation therewith for permitting said arms to be folded to a compact position substantially perpendicular to their fully extended radial position prior to said arms being moved to their fully extended radial position for attachment to a housing.

6. In a method of assembly of a flexible mounting system for an electric motor, the steps comprising:
forming a circular band of sheet metal with a plurality of pairs of apertured projections extending therefrom,
locating a flexible mounting arm having a scrolled end between each of said pairs of apertured projections, each said mounting arm comprising a unitary sheet metal element,
inserting a hinge pin fastener through said scrolled end and said pair of apertured projections to hold said mounting arm in pivotal engagement on said band, and
mounting, after said mounting arms have been so assembled with said band, said band around a motor body.

7. In a method of assembly in accordance with claim 6 wherein:
said mounting of said band around a motor body includes joining outwardly extending ends of said band to each other by means of a fastener.

* * * * *